Sept. 4, 1951 G. C. SZIKLAI 2,567,040

COLOR TELEVISION

Filed Dec. 26, 1947 2 Sheets-Sheet 1

INVENTOR
George C. Sziklai
BY [signature]
ATTORNEY

COLOR TELEVISION

Filed Dec. 26, 1947 2 Sheets-Sheet 2

INVENTOR
George C. Sziklai
BY [signature]
ATTORNEY

Patented Sept. 4, 1951 2,567,040

UNITED STATES PATENT OFFICE 2,567,040

COLOR TELEVISION

George C. Sziklai, Princeton, N. J., assignor to Radio Corporation of America, a corporation of Delaware Application December 26, 1947, Serial No. 793,932

1 Claim. (Cl. 178—5.2)

This invention relates to color television, and more particularly to methods and apparatus for the transmission of color television images in a simultaneous manner by the color additive process.

It has been reasonably well established in the art of colorimetry that substantially all colors can be visually simulated in reproduction by the addition in proper proportions of brightness of three "primary" or selected component colors. The three component colors will, for the purpose of brevity and example, be hereafter referred to as red, green and blue.

In color television, as in any color reproduction system, it is first necessary to make a component color analysis of the color of the object or image being televised. This, for example, may be accomplished by passing light from the object or image through red, green and blue filters, respectively. The light transmitted through the filters is thereafter utilized to form appropriate component color images by a suitable optical system or a photosensitive group of surfaces. Each of the tricolor analytical records thus obtained is scanned to produce three separate signal trains. At the receiver, each of the signal trains is then employed to control the corresponding scanning element to produce component color images. The several component color images are then combined to form an image in substantially its natural color.

This is the so-called additive process, and is utilized here merely by way of illustration. The invention applies as well to four-color additive reproductions, according to the theories of Zander, Hering and Ladd-Franklin. While the practice of this invention is applicable to television processes wherein the red, green and blue analytical images of a given scene or object are made in rapid succession, this invention is particularly applicable and is of great value in methods and systems of the type wherein component color image signals are transmitted simultaneously, and wherein the component color images are also combined simultaneously to form a natural color image.

Although the so-called sequential method of color image transmission requires a narrower transmission band, in this respect it has an advantage over the simultaneous methods and arrangements.

Such advantage, however, is largely offset in the simultaneous arrangement by reason of the fact that the photosensitive surface generating electrical signals representative of each of the tricolor images is active continuously. Furthermore, each of the photosensitive surfaces may be given an appropriate spectral sensitivity to the color of the image falling thereon to increase efficiency of the pickup devices, and perhaps most important of all is that, in the simultaneous methods, relative displacements between the images resulting from the motion of the subject are completely avoided. The avoidance of relative displacements between the images which occur in a sequential system results in objectionable "action fringes" or color margins, which are seen around the edges of moving colored objects.

Therefore, the only important suggested advantage of the sequential arrangement over the simultaneous system would seem to be the relatively narrow transmission band required for the sequential process, as compared to the simultaneous process.

It has been found that it is not necessary to transmit the same band width of frequencies for each of the primary colors in order to obtain high definition in reproduced images. It has been found that the delineatory capabilities of a primary color are determined by the contrast between the color of the light projected upon the screen and the color of the screen. In the normal reproduction of color images, it may be considered that the screen is normally black, consequently the delineatory capabilities of the blue color on such a screen are less than those of the red image which, in turn, are less than those of the green image. Since the delineatory capabilities determine the definition of an image, it will be appreciated that it is important that all of the frequencies and fine detail of the green image must be faithfully transmitted and reproduced in the receiver. On the other hand, the electrical currents representative of the red image will not reduce the definition of the image noticeably if the higher frequencies are suppressed, and this is also true to even a greater extent of the signal currents representative of the blue image. Tests have indicated that at least a 40% reduction in band width of the blue and the red image band of frequencies may be provided without any noticeable change in definition.

It will therefore be seen that the signal channels transmitting the red and the blue information no longer require the same band width as that of the green image channel.

Advantage has been taken of this fact by A. N. Goldsmith in U. S. Patent 2,335,180, dated November 23, 1943, in reducing the band width for the red and blue channels. Reference is also made in this connection to U. S. patent to Alfred C. Schroeder, No. 2,535,552, granted December 26, 1950, and Alda V. Bedford, No. 2,554,693, granted May 29, 1951.

It will be seen that the reduction in the channel width will, so to speak, reduce in a horizontal or line scanning direction the detail reproduced. According, however, to the Goldsmith Patent 2,335,180 referred to above, the same detail in a vertical direction is transmitted because of the maintenance of the same number of scanning lines.

According to this invention, an auxiliary signal is transmitted in place of the unused detail of the blue component signal channel by transmitting the auxiliary signal during alternate or interlaced scanning lines and reproducing the auxiliary image on a separate reproducing device.

In order to have a proper understanding of the operation of this invention, it may be well at this time to refer briefly to the theory of scanning, as employed in the development of television images.

The transmission and reproduction of television images are accomplished by analyzing the scene or image into its image elements, which are selected from the image area in an alternate sequence of scanning and transmitted one after another. Since the scanning and image repetition processes are essentially artificial ones, the number of picture elements and the total number of scanning lines, the sequence of transmission of the lines, the aspect ratio, and the rate of image repetition can be chosen arbitrarily, so long as they are similar at both the transmitter and receiver.

In the progressive or non-interlaced pattern, the scanning element moves at constant speed along the first active line until it reaches the right-hand edge of the pattern. At the end of this line, the element motion is suddenly reversed, and the scanning element moves quickly to the left-hand edge. During the retrace motion, the scanning element is generally made inactive or extinguished. When the element reaches the left-hand edge, it begins to trace out a second active line. This process of scanning is analogous to the procedure employed in reading. This process is repeated until the scanning element reaches the bottom of the image, at which time it is quickly returned to the upper left-hand corner of the page or image to repeat the scanning process.

The scanning pattern employed in the practice of transmission and reception of television images is, however, somewhat more complicated. It is designated as the interlaced type of scanning and consists of two sets of alternate lines. The lines must be spaced from each other by the width of one line, and the lines of one set must fit accurately into the spaces between the lines of the preceding set. The word "field" has been selected to designate a scanning pattern composed of half the total number of lines with blank spaces between them. The word "frame" has been designated as the complete scanning pattern, or two fields.

It will be seen, therefore, that a single field scanning will produce only half the detail in the vertical direction. It will be remembered, however, that a reduction of one-half of the detail of the blue color component image will not reduce the overall detail of the reproduced color image. It is, therefore, possible, without degradation of color image detail, to transmit only one field of each frame of the blue color component image. By appropriate arrangements of elements and switching devices, it is possible, therefore, to transmit additional information during half of the scanning time or, for example, during alternate scanning fields. This may be accomplished on either the odd or the even scanning lines in the scanning process.

A primary object of this invention is, therefore, to produce an improved television system.

Another object of this invention is to provide for a more economical employment of frequency spectrum in the transmission of television images.

Still another object of this invention is to provide for the transmission of additional image information and the like without the employment of additional band width.

Other and incidental objects of the invention will be apparent to those skilled in the art from a reading of the following specification and an inspection of the accompanying drawing in which.

Figure 1:
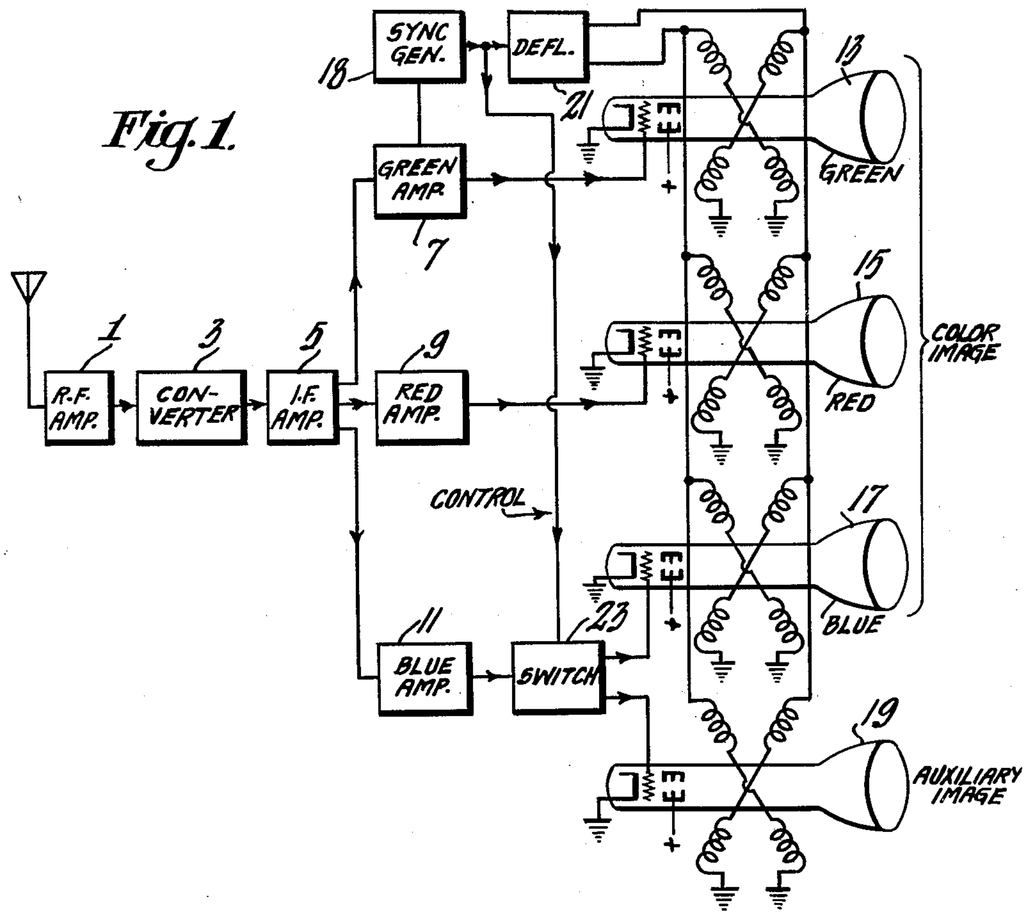
Figure 1 shows by block diagram one form of this invention.

Turning now in more detail to Figure 1, there is shown a television receiver arrangement capable of the reproduction of images in substantially their natural color, together with an auxiliary image reproducer.

A radio frequency amplifier 1 selects the desired radio frequency carrier and transfers energy to converter 3. The converter 3 produces for intermediate frequency amplifier 5 a desired band of intermediate frequencies which are further amplified in separate amplifiers color designated as green amplifier 7, red amplifier 9 and blue amplifier 11.

Although circuit arrangements are well known in the art for accomplishing the establishment of separate green, red and blue intermediate frequencies for the reproduction in color television, an improved arrangement is shown and described in my co-pending U. S. application, Serial No. 760,400, filed July 11, 1947, entitled "Signal Separator."

The separate color signals are then applied to the control electrodes of their respective image reproducing tubes or kinescopes 13, 15 and 17, which separately reproduce the selected component color images and form a natural color image by super-positioning of the selected component color images. One suitable form that the super-position of the selected component color images may take is illustrated, for example, in the Goldsmith Patent 2,335,180, referred to above.

The block 19 produces from the composite signal a synchronizing pulse for deflection control of deflection signal generator 21.

The deflection and control circuits suitable for employment in the practice of this invention are well known and described in the U. S. patent to Tolson et al., 2,101,520, dated December 17, 1937, or in the U. S. patent to Vance, 2,137,039, dated November 15, 1938.

Various electrodes of the electron gun not shown in detail in the drawing are to be supplied, as usual, with suitable operating potentials. This may be accomplished as taught in the television art.

Figure 2:
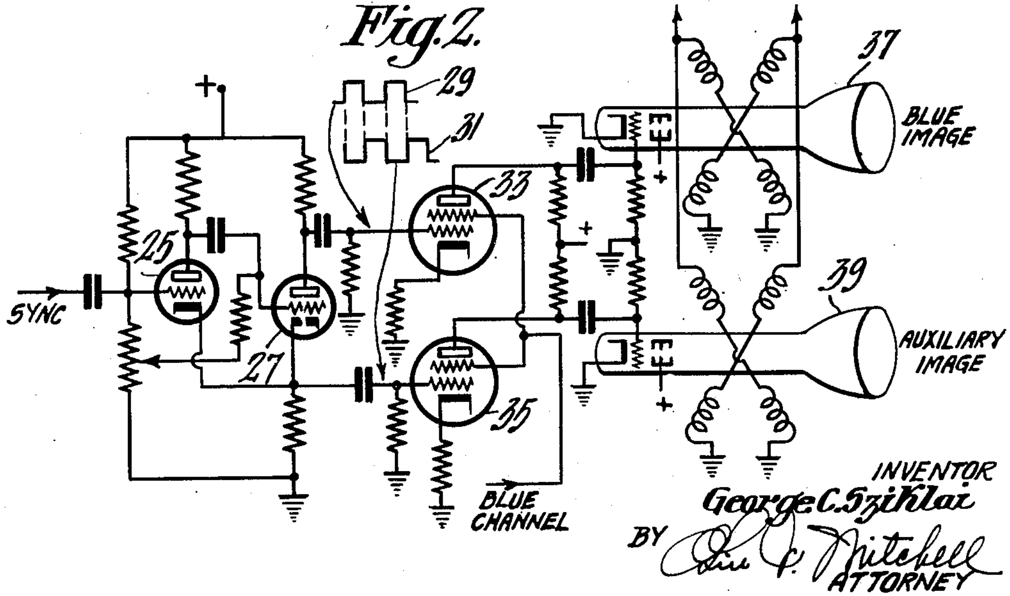
Figure 2 shows by detailed circuit diagram a switching arrangement suitable for employment in various forms of this invention.

Synchronizing pulses at field frequency are also transmitted through the connection marked "control" to switching arrangement 23 which may, for example, take the form of the multivibrator arrangement shown in detail in the circuit diagram of Figure 2.

The function of switch 23 is to alternately switch signals from the blue amplifier 11 between image reproducing tubes 17 and 19 during alternate scanning fields.

The deflection arrangements for tube 19 are connected to deflection generator 21 in a manner similar to the deflection arrangements for the green, red and blue component image reproducing tubes 13, 15 and 17.

The operation of the switch 23, therefore, causes image reproducing tube 17 and 19 to be operable alternately at field frequency.

It therefore follows that if the blue amplifier 11 furnishes during one field signals representative of the blue component image, while in the alternate fields furnishes signals representative of an auxiliary image, there will be produced alternately a blues component image in tube 17 and an auxiliary image in tube 19.

Figure 3:
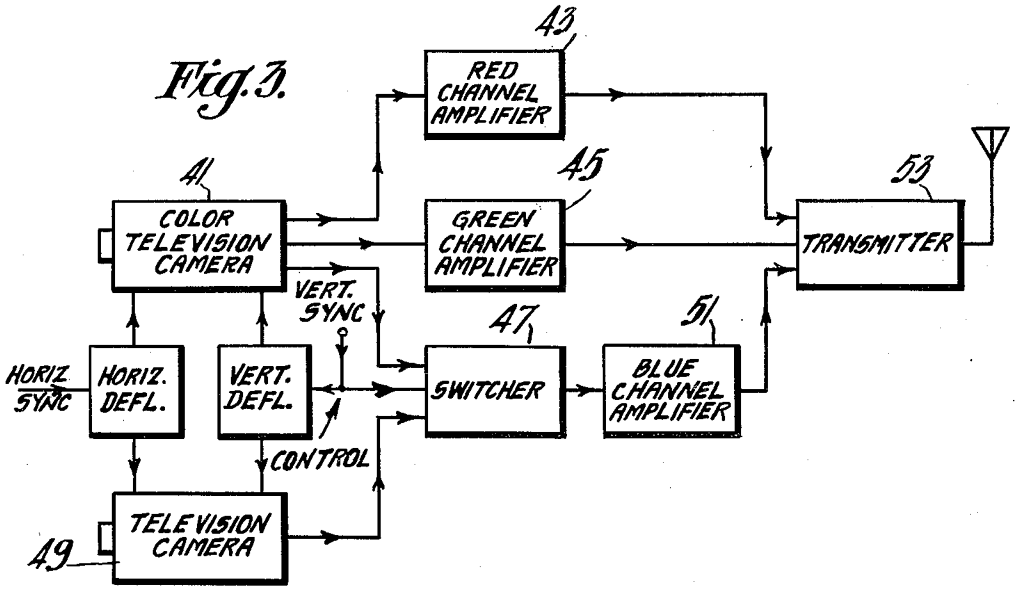
Figure 3 shows by block diagram one form of transmitter employing in practice one form of this invention.
Figure 4:
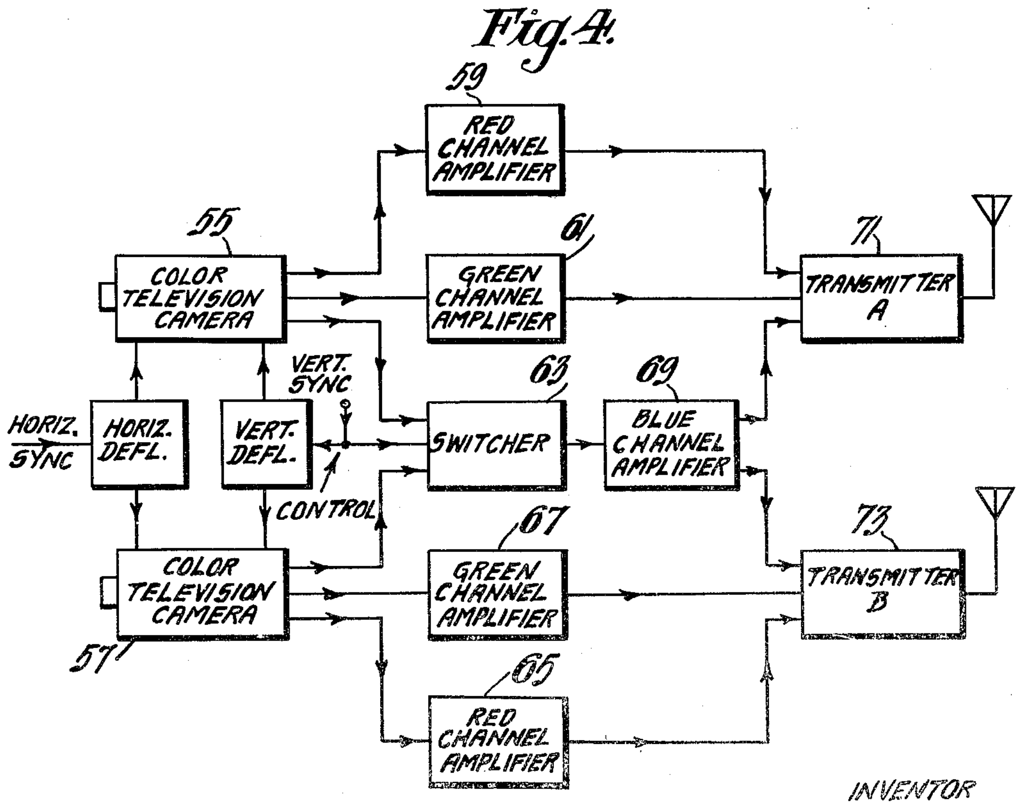
Figure 4 also shows by block diagram still another form of this invention as applied to television image pickup devices.

Suitable image pickup and transmission arrangements are shown in Figures 3 and 4 and will be described in more detail below.

Turning now in detail to Figure 2, there is shown a circuit diagram suitable to produce the switching necessary in the practice of this invention. The circuit arangement shown in Figure 2 may be substituted for the block 23 of Figure 1.

The synchronizing signal is applied to the control electrode of tube 25. The synchronizing signal applied to tube 25 will normally be the same as utilized for field deflection control in the television system.

The tube 25 operating in conjunction with tube 27 will produce in the output circuits two square waves, as indicated. It will be noticed that the square wave 29 is 180° out of phase with the square wave 31. This is obtained in the well-known manner by employing both an anode coupled output and a cathode coupled output to tube 27.

The operation of the multivibrator circuit, including tubes 25 and 27, is well known in the art and needs no detailed description here. The particular form of multivibrator illustrated is commonly known as the cathode coupled multivibrator, which produces in its output circuit a square wave whose frequency of recurrence is one-half that of the frequency of the incoming synchronizing pulses.

Square waves 29 and 31 are fed to a control electrode of tubes 33 and 35, respectively. Tubes 33 and 35, together with their associated circuit elements, are of a type whose operation is switchable by application of a potential to one of the control electrodes.

In the circuit arrangement shown, tubes 33 and 35 are alternately operative during alternate field scannings.

During operation of tubes 33 and 35, a signal is applied to another of their control grids, as illustrated, to be amplified therein. By applying the blue component image signal during alternate field scannings, tube 33, for example, will amplify only the blue image signal, while an auxiliary signal may be substituted for the blue component color image signal during alternate field scannings to be applied to and amplified in tube 35.

The connections and circuit arrangements shown will, therefore, cause blue image reproducing tube 37 to always receive on alternate field scannings the blue component signal, while auxiliary image reproducing tube 39 will receive on alternate field scannings only the auxiliary image signal.

Turning now to Figure 3, there is shown by block diagram one form of transmitter suitable for employment in the practice of this invention.

The terms "transmit," "transmitter" and "transmitting" do not contemplate a limitation to the radiant type of transmission. Once the signals are developed representing each of the color components and with varying degrees of image detail resolution, they may be conveyed or utilized by any suitable or well known means. This may, for example, be by the radiation of one or more modulated carrier frequencies or by conduction by apparatus such as coaxial cables or other appropriate conducting means. The terms, therefore, are used in their broad sense.

A suitable television camera 41, which may, for example, take any of the well known forms, such as those well shown and described in the article entitled "An Experimental Simultaneous Color Television System," beginning on page 861 of the "Proceedings of the Institute of Radio Engineers" for September 1947, furnishes appropriately designated color component signals to red channel amplifier 43, green channel amplifier 45, and switcher 47. The signal applied to switcher 47 by the color television camera 41 is the blue component signal.

Color television camera 41 is synchronized in the well known manner, together with television camera 49, which may, for example, take the form of the popular black and white camera shown and described in the article entitled "Image Orthicon Camera" by R. D. Kell and G. C. Sziklai, published in the "RCA Review" for March 1946.

Signals from the television camera 49 are also fed to switcher 47.

A portion of the vertical synchronizing signal energy is applied to switcher 47 to control its frequency of change. Switcher 47 may, for example, take the form shown in detail in the circuit diagram of Figure 2.

In accordance with the explanation given in the circuit diagram shown in Figure 2, the switcher 47 will, during alternate field scannings, pass signals from the color television camera 41 and from the television camera 49 to the blue channel amplifier 51.

Signals from the red, green and blue channel amplifier 43, 45 and 51 are then passed to the transmitter 53. A suitable transmitter is also shown and described in the article, "An Experimental Simultaneous Color Television System," referred to immediately above.

It will be seen that with the arrangements shown in Figure 3, transmitter 53 will transmit not only all the information necessary to produce a complete color image at the receiver, but will also transmit on alternate fields information concerning the image televised by television camera 49.

Turning now in detail to Figure 4, another form of transmitting system in accordance with the practice of this invention is shown by block diagram.

A color television camera 55 and a color television camera 57 are designed and arranged to pick up separate color images.

Due to the fact, however, that it is necessary only to transmit alternate blue representative signals during alternate fields of scanning, it is possible to combine the blue representative signals from two independent systems on one frequency by alternately sending each of the blue fields from separate cameras 55 and 57.

The color television camera 55 furnishes component color representative signals to the appropriate red channel amplifier 59, the green channel amplifier 61 and the switcher 63, likewise, the color camera 57 furnishes representative signals to the red channel amplifier 65, the green channel amplifier 67 and the switcher 63.

The switcher 63 is controlled by the vertical synchronizing signal to switch the blue channel amplifier 69 alternately between cameras 55 and 57.

It will be seen, therefore, that the radio frequencies employed in transmitter 71 and transmitter 73 may overlap to the extent of sending both their blue signals on the same radio frequency channel, and thus saving in two color transmitters a band width equivalent to the blue signal channel.

Having thus described the invention, what is claimed is:

In a color television system of the type employing the transmission of substantially red, substantially blue and substantially green component color image representative signal trains developed by interlaced scanning, a first image reproducing device adapted to reproduce a substantially blue component color image from said substantially blue component color image representative signal train, a second image reproducing device, a switching device connected to said first and second image reproducing device, means for applying to said switching device alternately during only alternate field scannings said substantially blue component color image representative signal train and an additional image representative signal train developed by interlaced scanning.

GEORGE C. SZIKLAI.

REFERENCES CITED

The following references are of record in the file of this patent:

UNITED STATES PATENTS

| Number | Name | Date |
|---|---|---|
| 2,333,969 | Alexanderson | Nov. 9, 1943 |
| 2,335,180 | Goldsmith | Nov. 23, 1943 |